Feb. 16, 1965

O. G. MAXSON 3,169,272

APPARATUS FOR MAKING PLASTIC TUBING

Filed Oct. 30, 1962

INVENTOR.
ORWIN G. MAXSON
BY
ATTORNEY

Feb. 16, 1965  O. G. MAXSON  3,169,272
APPARATUS FOR MAKING PLASTIC TUBING
Filed Oct. 30, 1962  2 Sheets-Sheet 2

INVENTOR.
ORWIN G. MAXSON
BY
ATTORNEY

United States Patent Office 3,169,272
Patented Feb. 16, 1965

3,169,272
APPARATUS FOR MAKING PLASTIC TUBING
Orwin G. Maxson, Ponca City, Okla., assignor to Continental Oil Company, Ponca City, Okla., a corporation of Delaware
Filed Oct. 30, 1962, Ser. No. 234,056
9 Claims. (Cl. 18—14)

This invention relates to an apparatus for forming plastic materials and, more particularly, it relates to apparatus for forming plastic substances into continuous tubing utilizing extrusion methods and apparatus.

With the advent of different plastic materials, it has been found advantageous to form some of these materials into various shapes for many varied uses. For example, in some instances certain of these materials may be formed into pipe which is used to conduct corrosive fluids having a deleterious effect on materials previously used for conduits. In addition, plastic tubing and similar articles have been found to have advantages in situations which require a sinuous conduit path, or wherein weight may be a problem.

While plastic conduit has found wide acceptance in many industries, it is, nevertheless, subject to some limitations which have restricted its utilization under some circumstances. For instance, while the flexibility of plastic tubing is sometimes an advantage, in other situations where external crushing stresses may be placed upon the tubing, such flexibility is a definite limitation to its use.

Obviously by increasing the rigidity of the plastic, it would be possible, to some extent, to obviate the limitation pointed out above. There are many well-known plastics which, when extruded, will produce a relatively rigid article. However, until the present invention, difficulty was encountered in continuously extruding relatively rigid plastic pipe.

It is, therefore, an object of this invention to provide apparatus for the extrusion of relatively rigid tubing without the necessity of periodically interrupting the extrusion process.

A further object of this invention is to provide apparatus for the extrusion of tubing without the necessity for plugging the tubing being extruded.

Another object of this invention is to provide apparatus for the extrusion of plastic substances into continuous tubing having a smooth exterior and constant dimensional cross section.

Another object of this invention is to provide apparatus for the extrusion of plastic substances into rigid as well as flexible tubing.

Another object of this invention is to provide apparatus for the extrusion of plastic substances into tubing without maintaining superatmospheric pressure within the interior of the tubing before it has cooled and set.

Still another object of this invention is to provide an extrusion apparatus which can be initiated with a minimum of effort.

Yet another object of this invention is to provide an extrusion apparatus which provides increased convenience in interchanging extruding dies and associated sizing and cooling equipment.

An additional object of this invention is to provide apparatus for the removal of gases between the exterior surface of heat-softened tubing and interior surfaces of dies used in an extrusion process to size the heat-softened tubing after extrusion.

Various other objects and advantages will appear from the following description of one embodiment of the invention.

One embodiment of apparatus which may be used in practicing this invention comprises a tubing extruder which abuts means for cooling and sizing tubing emerging from the extruder. This latter means may include a vacuum chamber which is partially filled with coolant and a perforated sleeve extending into the coolant for receiving heat-softened tubing from the extruder. Means are also provided for venting the interior of the tubing to the atmosphere.

According to one method for practicing this invention, plastic is first formed into heat-softened tubing whereupon it is sized and cooled. During a substantial portion of the sizing and cooling operation, the interior of the tubing is maintained at atmospheric pressure while the exterior of the tubing is subjected to subatmospheric pressure.

The apparatus as hereinafter described may be more readily understood by referring to the accompanying drawings in which.

Figure 1:
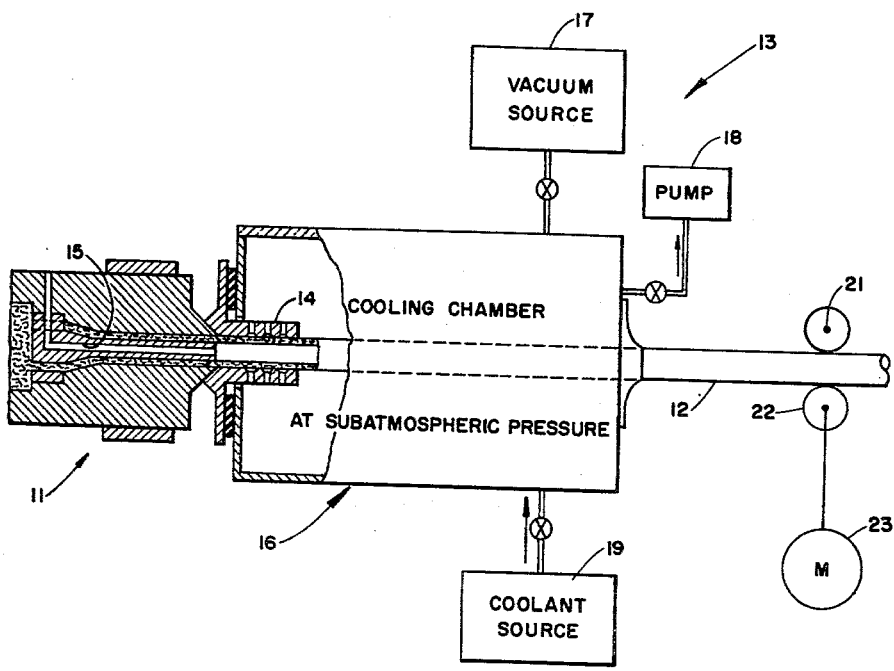
FIGURE 1 is a diagrammatic side elevation, shown partially in section, of one form of apparatus embodying this invention, showing its relationship to cooperating structures.

Referring now to the drawings and particularly to FIGURE 1, there is shown means for forming material, such as an extruder head 11, which, in the embodiment shown, is utilized to form tubing 12, the interior of which communicates with the atmosphere through a vent 15 in the extruder head. Adjacent extruder head 11 is means, indicated generally at 13, for cooling and sizing the open-ended tubing 12 while subjecting the exterior of the tubing to subatmospheric pressure. Means 13 may include means for shaping tubing, such as a sizing bushing 14, which projects into a cooling chamber 16, the interior of which is maintained at subatmospheric pressure by a vacuum source indicated generally at 17. Means, such as a pump 18, is also in communication with the interior of chamber 16, and functions to remove a portion of coolant passing into the chamber from a coolant source indicated generally at 19, which may be a pump, a pressurized reservoir, or other similar apparatus. Means are provided for applying tension along the longitudinal axis of the tubing for pulling the tubing from the interior of chamber 16; and in the embodiment shown, this means comprises an idler roller 21 cooperating with a driven roller 22, which is powered by a variable speed motor 23.

Figure 2:
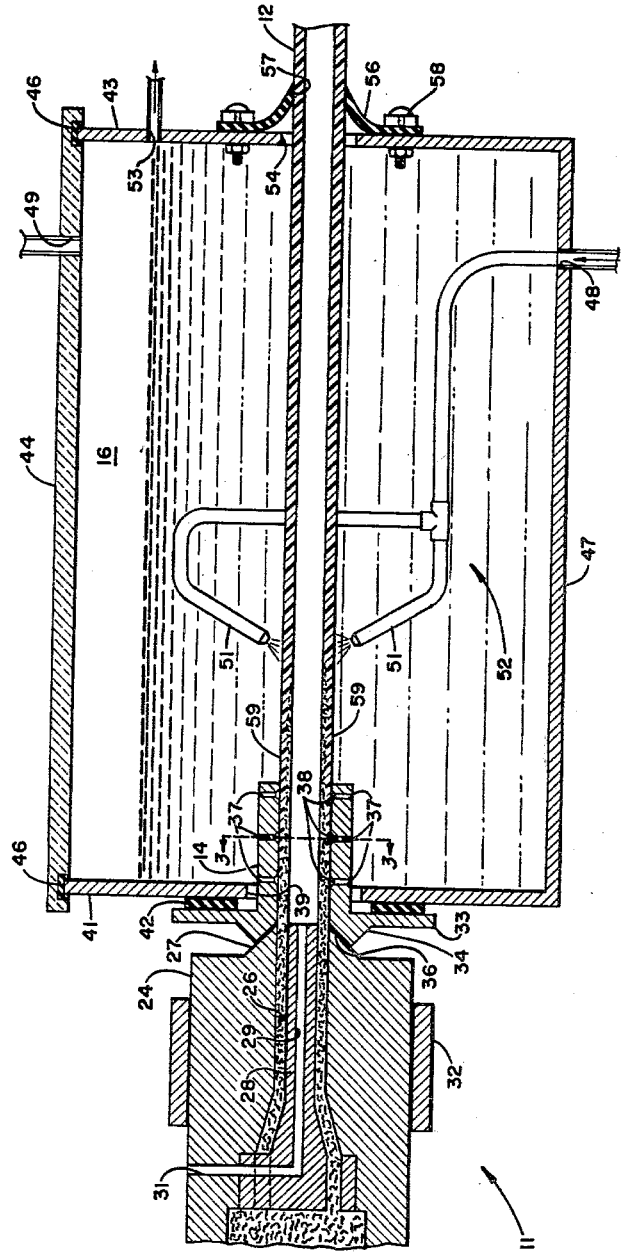
FIGURE 2 is an enlarged sectional view taken parallel with the side elevation view of FIGURE 1 and showing the cooperation between an extruder head and means for shaping material ejected from the extruder head.

Turning now to FIGURE 2, in the embodiment shown, extruder head 11 may be seen to comprise a relatively massive body member 24 having an aperture 26 therein which is coaxial with a frustro-conical projection 27 formed on the body member. Within aperture 26 is fixed a mandrel 28 having an axial bore 29 communicating with the interior of the tubing being extruded. Normal to bore 29 and communicating therewith, is a channel 31 formed in body member 24 and terminating at the exterior surface thereof. Taken together, bore 29 and channel 31 cooperate to form vent 15 shown in FIGURE 1. A heater 32 engages member 24 and serves to maintain the member at a temperature at or above the flow point of the material from which tubing 12 is formed.

Figure 3:
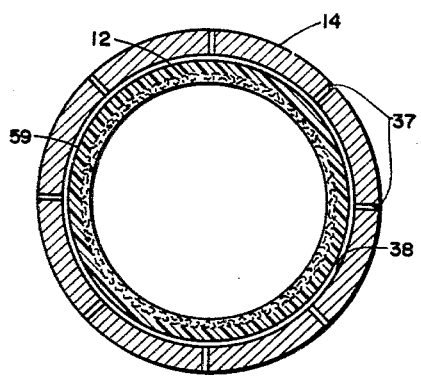
FIGURE 3 is an enlarged sectional view taken along line 3—3 of FIGURE 2 showing a portion of a cooling and sizing die which is included in the means for shaping material from the extruder head shown in FIGURE 2.

Sizing bushing 14 is connected to, or integral with, an enlarged plate 33 having a thickened portion 34 which is recessed at 36 to receive projection 27 in a relatively gastight fit. Opposite plate 33, sizing bushing 14 is equipped with means for equalizing pressure on its inner and outer surfaces. In the present embodiment, this means is shown as a plurality of radial apertures 37 passing through the bushing, which apertures communicate with a plurality of circular grooves 38 formed on the inner surface of the bushing. As shown in FIGURE 3, each of the grooves 38 lies in a plane substantially normal to the longitudinal axis of bushing 14. It will be appreciated that other configurations of the grooves can be utilized. For instance, a single spiral groove would be found satisfactory if indicated by equipment design criteria.

Referring again to FIGURE 2, it may be seen that bushing 14 extends through an opening 39 in a wall 41 of chamber 16 into the interior thereof. Sealing means, such as an annular gasket 42 is utilized to maintain a fluid tight seal between plate 33 and wall 41.

Cooling chamber 16 includes the wall 41, a parallel wall 43 spaced therefrom, a cover 44 spaced from said walls by a gasket 46, and a floor plate 47 fitted with a coolant supply port 48 which communicates with coolant source 19. Similarly, cover 44 is apertured at 49 to allow communication between vacuum source 17 and the interior of chamber 16. Coolant, which is preferably water, is impinged on tube 12 as it emerges from bushing 14 by a plurality of nozzles 51 which receive coolant from a header arrangement indicated generally at 52. Coolant thus supplied is removed from chamber 16 by pump 18 through an aperture 53 in wall 43.

In an alternate arrangement (not shown), aperture 49 is eliminated and a turbine or other high output, positive displacement pump is connected to the coolant exit port. With such an arrangement, the turbine pump will maintain both a vacuum within chamber 16 and the desired coolant level.

Surrounding a tubing exit port 54 in wall 43, is a coolant wiper, which, in the embodiment shown, comprises a donut-shaped, flexible, elastic plate 56 having a concentric circular opening 57 therein of a diameter substantially less than the diameter of tubing 12. Plate 56 is held in place by fastening means indicated generally at 58 and is sufficiently flexible to form a seal around tubing 12 when pressure on the interior of the tank is decreased below atmospheric pressure, while permitting tubing to be withdrawn by rollers 21 and 22 (FIGURE 1), or by other means.

In one method of assembling the structure shown in FIGURE 2, means, not shown, is actuated to bring the projection 27 on body member 24 into firm contact with recess 36 associated with bushing 14. Coolant is then injected into chamber 16 until it reaches a level just below aperture 53. Sufficient tubing is then extruded and cooled until the first end portion of the extruded tubing can be inserted between rollers 21 and 22. When the tubing has been so inserted, cover 44 is placed in the position shown in FIGURE 2, the injection of coolant is resumed and a vacuum is applied to chamber 16 through aperture 49. As coolant reaches the final desired level shown in FIGURE 2, withdrawal of coolant is begun and injection and removal of coolant are adjusted to maintain a constant level in the cooling chamber. The extrusion process is then continued as desired.

Upon entering sizing bushing 14, tubing 12 is still in heat-softened condition and would collapse if no interior support were present. However, when the present invention is utilized, the interior of the tubing is in communication with the atmosphere and a partial vacuum exists on the outer tubing wall. Sufficient pressure differential is thus obtained to hold the heat-softened plastic against the cold inner surface of bushing 14 until the outer surface of the tubing has cooled to form a chilled outer skin of relatively hard plastic, indicated at 59. This chilled skin is sufficiently strong to withstand the pressure differential without rupturing when the tubing leaves bushing 14.

Simultaneously, any gas that may be located between the interior wall of sizing bushing 14 and the exterior surface of tubing 12, usually due to leakage between projection 27 and recess 36, escapes to the interior of chamber 16 through grooves 38 and apertures 37. The escape of this gas overcomes the possibility of rupture of the tubing on leaving bushing 14, which may otherwise occur due to the failure of a chilled skin 59 to form in the area of the occluded air.

Under ordinary operating conditions, the temperature of the coolant is not critical. In general, the flow temperature of the material being extruded varies from 250° to 600° F. In any event, the coolant temperature should be from about 10 to about 200° lower than the material flow temperature. It is stressed, however, that this temperature differential is not critical and, if conditions necessitate, a smaller or larger temperature differential may be utilized without unduly affecting the product.

The pressure differential impressed across the extruded tubing by means of the vacuum system is likewise not critical. In general, this pressure differential should be great enough to insure firm contact between the heated plastic material with the interior of sizing bushing 14 and, at the same time, it should be not so great as to cause rupture of the tubing as it leaves the sizing bushing. Satisfactory pressure differentials will be a function of many factors. Among these factors will be the depth of the coolant, the temperature differential between the coolant and the flow point of the extruded material, the length of the sizing bushing and the wall thickness of the extruded tubing. Under any circumstances however, the pressure differential may vary between wide limits. Ordinarily, a pressure differential of from 1 to 5 p.s.i.a. will be well within any critical limits, and values outside this range can be expected to give good results should the desirability for such values arise.

When operating this device, the thickness of the walls of the extruded tubing may be controlled by the relative speed of withdrawal of the tubing from the extruder head by rollers 21 and 22. In general, the faster the withdrawal of the tubing in relation to the rate of extrusion, the thinner will be the walls. Similarly, withdrawal of the tubing may, if desired, be slowed down to such an extent that the resulting product will take the form of a solid cylindrical bar of plastic. Inasmuch as this is a common technique for controlling tubing thickness, the particular speed ratios required for a given wall thickness may be determined for any particular piece of equipment by one skilled in the art by the obvious expedient of trying a variety of speed ratios and observing the corresponding wall thickness.

Ordinarily, when tubing not exceeding about 4 inches in diameter is produced with this device, the differential hydrostatic pressure between the top and the bottom of the tubing will be insignificant. As tubing diameters increase, however, it is possible that this differential hydrostatic pressure will result in some distortion of the tubing unless corrective measures are taken. This is especially true when relatively thin-walled tubing is produced. However, such corrective measures need not involve basic equipment changes, but can instead be furnished by adjusting the operating conditions of the equipment. For instance, as one possibility the vacuum within chamber 16 may be increased simultaneously with a decrease in the coolant temperature. Such a procedure would insure that the hydrostatic pressure at the bottom of sizing bushing 14 would not be so great as to overcome the differential pressure between the atmosphere and the exterior pressure impressed on the bottom of the tubing by the vacuum. At the same time, the lowering of the coolant temperature would serve to increase the thickness of the chilled skin formed within the sizing bushing to allow greater differential pressures across the extruded tubing as it leaves the bushing. This is but one method by which any slight problems arising from differential hydrostatic pressure might be overcome. Other methods will be apparent to those skilled in the art without necessitating the exercise of the inventive faculty.

It will be understood that various changes in the details, materials, steps, and arrangement of parts, which have been herein described and illustrated in order to explain the nature of the invention, may be made by those skilled in the art within the principle and scope of the invention.

I claim:

1. Apparatus for forming plastic material which comprises:
    means for forming a plastic substance into heat-softened tubing, said means including a vent communicating with the interior of the heat-softened tubing and with the atmosphere;
    means adjacent said forming means for shaping the heat-softened tubing, said shaping means including means for equalizing pressure between the interior and exterior of said shaping means;
    a substantially gas-tight chamber surrounding at least a portion of said shaping means for holding fluid for cooling the tubing; and
    means communicating with the interior of said chamber for creating a zone of subatmospheric pressure within at least a portion of said chamber.

2. Apparatus as defined in claim 1 wherein the forming means comprises a body member having an aperture therein and a mandrel fixed within said aperture, and wherein a portion of the body member and mandrel are traversed by the vent.

3. Apparatus as defined in claim 1 wherein the means for shaping the heat-softened tubing comprises a bushing, the diameter of the bore of which is substantially equal to the diameter of the aperture within the body member.

4. Apparatus as defined in claim 1 wherein the means for shaping the tubing comprises a cylindrical bushing having a radial aperture therein.

5. Apparatus as defined in claim 4 wherein the bushing has a groove in its interior surface communicating with the aperture.

6. Apparatus as defined in claim 5 further comprising means for pulling tubing away from the cooling means.

7. Apparatus for extruding a plastic substance into tubing which comprises:
    an extruding die comprising an apertured body member and a mandrel fixed within the aperture;
    the body member and mandrel having formed therein a vent communicating at one end with the atmosphere and at the other end with the interior of the extruded tubing;
    a cylindrical sizing sleeve having a plurality of radial apertures therethrough and having in its interior surface a plurality of grooves in a plane normal to the axis of the sleeve, each of said grooves being in communication with at least one of said apertures;
    a cooling chamber having formed therein an opening through which at least a portion of the cylindrical sizing sleeve is inserted and a tubing withdrawal port, the withdrawal port being fitted with a flexible annular plate for restricting the flow of coolant around the tubing to the exterior of the chamber and,
    means communicating with the interior of said chamber for forming a zone of subatmospheric pressure therein.

8. Apparatus for sizing and cooling extruded plastic tubing which comprises:
    a vacuum tight chamber having aligned first and second apertures therein;
    means communicating with the interior of said chamber for maintaining a vacuum therein;
    a sizing die passing through said first aperture and terminating at a point within the chamber, said sizing die including means to equalize a pressure between the interior and exterior of said die;
    means communicating with the interior of said chamber for maintaining liquid coolant within said chamber at a level below the top thereof and above the top of said sizing die; and
    means associated with said second aperture for forming a gas-tight seal with tubing passing therethrough.

9. The apparatus defined in claim 8 further characterized by having means through a wall of the chamber for impinging water upon tubing passing from the terminus of the sizing die within the chamber.

References Cited by the Examiner

UNITED STATES PATENTS

| | | | |
|---|---|---|---|
| 2,194,313 | 3/40 | Loomis | 18—14 XR |
| 2,485,857 | 10/49 | Bower. | |
| 2,616,128 | 11/52 | Barry et al. | 18—14 |
| 2,922,194 | 1/60 | Lampard | 264—209 |
| 3,003,194 | 10/61 | Hunkeler | 264—209 |
| 3,009,208 | 11/61 | Pirot | 264—95 |
| 3,013,309 | 12/61 | Maier et al. | 264—95 |
| 3,051,992 | 9/62 | Bradley | 18—14 XR |
| 3,069,724 | 12/62 | Schiedrum | 18—14 |
| 3,095,608 | 7/63 | Munsell | 18—14 |
| 3,102,303 | 9/63 | Lainson | 18—14 |
| 3,105,269 | 10/63 | Seubert | 18—14 |
| 3,119,147 | 1/64 | Kracht | 18—6 XR |
| 3,129,461 | 4/64 | Zavasnik et al. | 264—209 |

FOREIGN PATENTS 880,391 10/61 Great Britain.

WILLIAM J. STEPHENSON, *Primary Examiner.*

ALEXANDER H. BRODMERKEL, MICHAEL V. BRINDISI, *Examiners.*